(12) United States Patent
Wright et al.

(10) Patent No.: US 9,216,724 B1
(45) Date of Patent: Dec. 22, 2015

(54) BRAKE MAINTENANCE INDICATOR

(71) Applicant: NEW YORK AIR BRAKE, LLC, Watertown, NY (US)

(72) Inventors: Eric C. Wright, Evans Mills, NY (US); Jason Connell, Bethel Park, PA (US)

(73) Assignee: New York Air Brake, LLC, Watertown, NY (US)

( * ) Notice: Subject to any disclaimer, the term of this patent is extended or adjusted under 35 U.S.C. 154(b) by 0 days.

(21) Appl. No.: 14/463,781

(22) Filed: Aug. 20, 2014

(51) Int. Cl.
*B60T 17/22* (2006.01)
*B61H 11/00* (2006.01)
*B61H 13/34* (2006.01)

(52) U.S. Cl.
CPC ............... *B60T 17/228* (2013.01); *B60T 17/22* (2013.01); *B61H 11/00* (2013.01); *B61H 13/34* (2013.01)

(58) Field of Classification Search
CPC ....... B60T 17/22; B60T 17/228; B61H 11/00; B61H 13/34
See application file for complete search history.

(56) References Cited

U.S. PATENT DOCUMENTS 4,641,892 A 2/1987 Schmid

FOREIGN PATENT DOCUMENTS

| DE | 1127388 | 4/1962 |
|---|---|---|
| DE | 2123374 | 11/1972 |
| DE | 102010048818 | 4/2012 |
| EP | 0069280 | 1/1983 |
| EP | 1164067 | 12/2001 |
| FR | 2252237 | 6/1975 |
| FR | 2332898 | 6/1977 |
| GB | 1208932 | 10/1970 |
| WO | 2012038277 | 3/2012 |
| WO | 2013152006 | 10/2013 |

OTHER PUBLICATIONS

International Search Report Form PCT/ISA/220, International Application No. PCT/US2014/051802, pp. 1-10, Dated Feb. 17, 2015.

*Primary Examiner* — Thomas Tarcza
*Assistant Examiner* — Kevin Myhre
(74) *Attorney, Agent, or Firm* — David L. Nocilly; Bond Schoeneck & King, PLLC

(57) ABSTRACT

A brake maintenance indication system having a first portion determines the brake cylinder pressure and a second portion that is configured to determine the intended brake cylinder pressure based on the difference between the brake pipe pressure and the emergency reservoir pressure. The intended brake cylinder pressure is preferably determined to be 2.5 times of the difference between the brake pipe pressure and the emergency reservoir pressure. In the event of brake cylinder over-pressurization or under-pressurization, an indicator is flagged, thus identifying the presence of a problem with the braking system.

18 Claims, 7 Drawing Sheets

BRAKE MAINTENANCE INDICATOR

BACKGROUND OF THE INVENTION

1. Field of the Invention

The present invention relates to rail car braking systems and, more particularly, to a warning indicator reflecting low brake cylinder pressure and brake system leakage into the brake cylinder.

2. Description of the Related Art

Control valves used in freight car brake systems, such as the DB-60 control valve manufactured by New York Air Brake Corporation of Watertown, N.Y., or the AB-type control valves manufactured by Wabtec Corporation of Wilmerding, Pa., typically supply air pressure to the brake cylinder of a freight car. If the brake cylinder or the plumbing between the control valve and the car has a leak, however, the brake cylinder will not maintain the original set pressure. In addition to brake cylinder leakage, resulting in low brake cylinder pressure, the brake system can leak into the brake cylinder, resulting in high brake cylinder pressure.

Recent improvements to AAR brake systems include the addition of brake cylinder maintaining valves, which compensate for brake cylinder leakage. Another improvement includes the addition of a brake cylinder limiting valve, which exhausts brake cylinder over-pressure resulting from leakage into the brake cylinder. While these improvements may improve the overall safety of the brake system, they may obscure the presence of brake defect, making detection more difficult and thereby delaying corrective action. As a result, there is a need for a system that can provide a clear indication when the braking system low brake cylinder pressure or brake system leakage into the brake cylinder.

BRIEF SUMMARY OF THE INVENTION

The present invention comprises a brake maintenance indication system having a first portion in communication with a source of brake cylinder pressure that is configured to determine the brake cylinder pressure and a second portion in communication with a source of brake pipe pressure and a source of emergency reservoir pressure that is configured to determine the intended brake cylinder pressure based on the difference between the brake pipe pressure and the emergency reservoir pressure. A first indicator provides a signal when the brake cylinder pressure is less than the intended brake cylinder pressure and a second indicator provides a signal when the brake cylinder pressure exceeds the intended brake cylinder pressure. Preferably, the intended brake cylinder pressure is determined to be 2.5 times the difference between the brake pipe pressure and the emergency reservoir pressure.

In one embodiment, the first indicator is an indicator button that is moveable between a retracted position when the brake cylinder pressure is the same as the intended brake cylinder pressure and an extended position when the brake cylinder pressure is less than the intended brake cylinder pressure. The second indicator is an indicator button that is moveable between a retracted position when the brake cylinder pressure is the same as the intended brake cylinder pressure and an extended position when the brake cylinder pressure exceeds the intended brake cylinder pressure. The indicators may retract after providing the signal, or may be held in the extended position until manually reset.

The first portion of the system determines actual brake cylinder pressure and may be provided using pressure chambers and a diaphragm to have a first chamber in communication with the source of brake cylinder pressure, a second chamber in communication with atmospheric pressure, and a first diaphragm separating the first and second chambers and having a first wetted area, where the diaphragm configured to move the first indicator between the retracted and extended positions. A spring may be used to provide a force biasing the indicators into the retracted position and thus produce a small level of tolerance. The second portion of the system determines the intended brake cylinder pressure and has a third chamber in communication with a source of brake pressure, a fourth chamber in communication with a source of emergency reservoir pressure, and a second diaphragm separating the third and fourth chambers that has a second wetted area that is greater than the first wetted area by a ratio of 2.5:1, with the diaphragm being configured to move the second indicator between the retracted and extended positions.

In another embodiment of the invention, the system may be provided using digital or analog circuitry. In this embodiment, the first portion comprises a first pressure transducer, the second portion comprises second and third pressure transducers as well as a circuit for calculating the intended brake cylinder pressure as 2.5 times the difference between the brake pipe pressure and the emergency reservoir pressure. The first and second indicators preferably comprise light emitting diodes. The circuit for calculating the intended brake cylinder pressure may be an analog circuit, a digital circuit, or some combination thereof.

The various embodiments of the present invention may be interfaced to a braking system by providing the indictor in a housing that encloses the first and second portions and the retracted first and second indicators, and additionally has a series of conduits configured to operatively interconnect said first and second portions to a 4-port testing interface that can provide the source of brake cylinder pressure, the source of brake pipe pressure, and the source of emergency reservoir pressure. The housing may include a series of ports configured to operatively connect the conduits of the housing to a 4-port test adaptor affixed thereon so that conventional testing operations can be conducted with the invention installed in place on the 4-port testing interface. Alternatively, the first and second portions and the first and second indicators may coupled to a control valve in any of at least various locations that can provide the source of brake cylinder pressure, the source of brake pipe pressure, and the source of emergency reservoir pressure.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
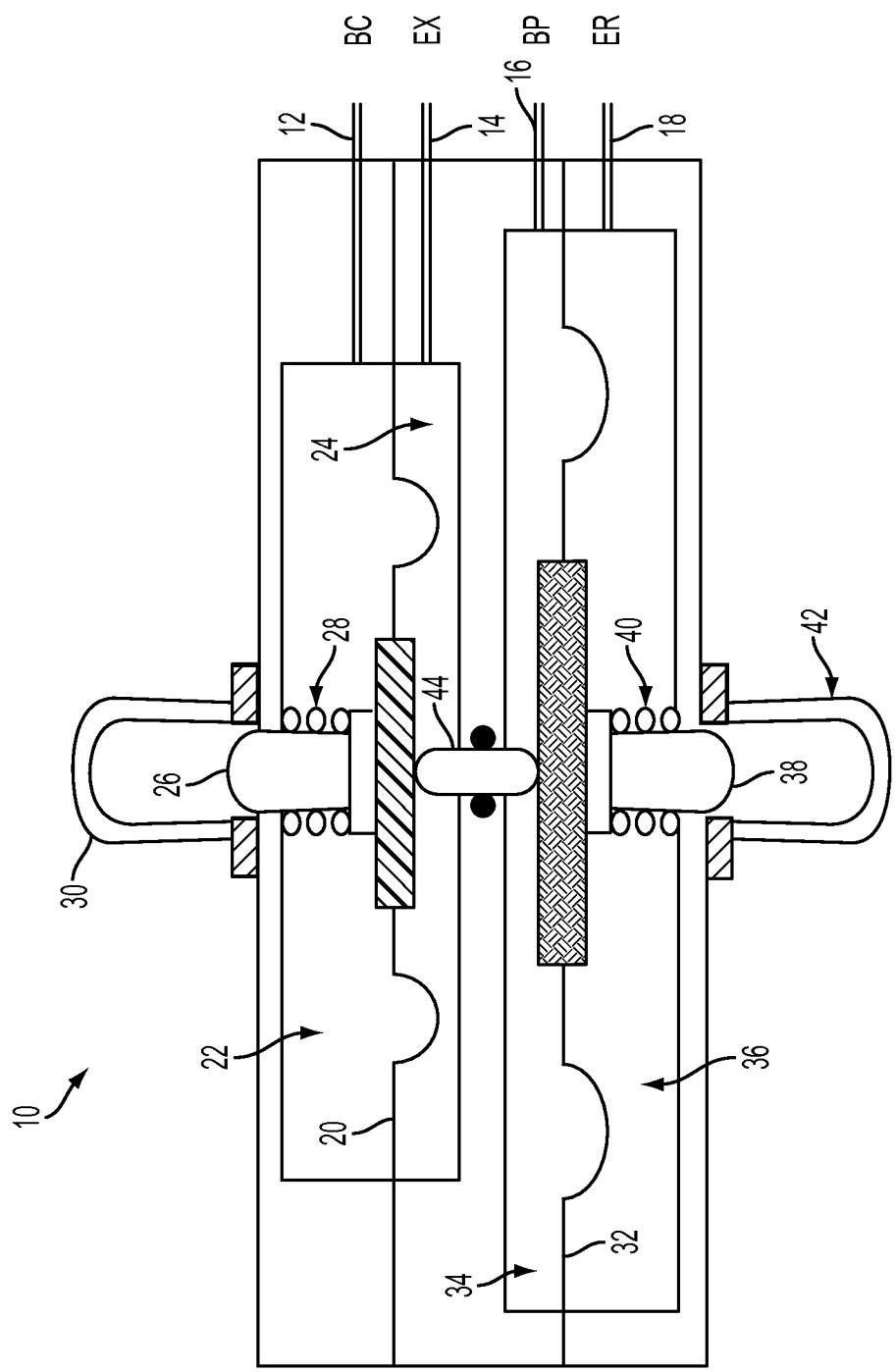
FIG. 1 is a schematic of a first embodiment of a brake maintenance indication system according to the present invention.

Referring now to the drawings, wherein like reference numerals refer to like parts throughout, there is seen in FIG. 1 a brake maintenance indication system 10 for indicating over-pressurization of a brake cylinder or a brake cylinder leak that leads to under-pressurization. As seen in FIG. 1, indication system 10 comprises a first port 12 in fluid communication with a source of brake cylinder pressure BC, a second port 14 in fluid communication with an exhaust EX (atmospheric pressure), a third port 16 in fluid communication with a source of brake pipe pressure BP, and a fourth port 18 in communication with a source of emergency reservoir pressure ER.

Indication system 10 further comprises a first diaphragm 20 separating a first chamber 22 that is in communication with first port 12 from a second chamber 24 that is in communication with second port 14. Diaphragm 20 is operatively engaged to a visual indicator 26 that is moveable between a retracted position, where indicator 26 is housed substantially within first chamber 22, and an extended position, where indicator 26 extends outwardly from first chamber 22. Indicator 26 is biased into the retracted position by a spring 28. Spring 28 preferably has a preload that provides a force of about 10 psi biasing indicator 26 toward the retracted position, providing a defined hysteresis between the actual brake cylinder BC pressure and the target brake cylinder BC pressure, to prevent erroneous fault indication. Other values of pressure bias may be provided by selecting the corresponding spring 28 preload. A transparent or translucent indicator cover 30 may be positioned in covering relation to indicator 26, thereby maintaining the pressure envelope, protecting indicator 26 and preventing the ingress of any environmental contaminants into indication system 10, while allowing indicator 26 to move into an extended position that is visible from outside system 10.

A second diaphragm 32 is positioned in indication system 10 to separate a third chamber 34 that is in communication with third port 16 and thus brake pipe pressure BP from a fourth chamber 36 that is in communication with fourth port 18 and thus emergency reservoir pressure ER. Diaphragm 32 is operatively engaged to a second visual indicator 38 that is moveable between a retracted position, where indicator 38 is housed substantially within fourth chamber 36, and an extended position, where indicator 38 extends outwardly from fourth chamber 36. Indicator 38 is biased into the retracted position by a second spring 40. Spring 40 preferably has a preload that provides a bias force of about 10 psi moving indicator 38 into the retracted position. A second transparent or translucent indicator cover 42 may be positioned in covering relation to indicator 38, thereby maintaining the pressure envelope, protecting indicator 38 and preventing the ingress of any environmental contaminants into indication system 10, while allowing indicator 38 to be visible from the outside when in the extended position. Forces associated with the movement of second diaphragm 32 are communicated to first diaphragm 20 via a floating pin 44.

The wetted area of second diaphragm 32 is selected to be about 2.5 times the wetted area of first diaphragm 20. The 2.5:1 differential pressure is selected to account for the ratio of brake pipe pressure BP reduction to brake cylinder pressure BC required in an AAR compliant system. More specifically, because of the volumetric relationship between the auxiliary reservoir and the brake cylinder in an AAR braking system, a reduction in the brake pipe pressure BP will cause an increase in brake cylinder pressure BC which is 2.5 times the brake pipe pressure BP reduction. For example, when an operator makes a 10 psi brake pipe pressure BP reduction to actuate the brakes, the brake cylinder pressure BC is increased by 25 psi. The present invention may be configured for a different differential pressure as desired or as required by a non-AAR compliant system or a braking system having different requirements.

Indication system 10 thus has one portion that determines the difference between the emergency reservoir pressure ER and the brake pipe pressure BP to determine any brake pipe reduction, and thus the intended brake cylinder pressure BC increase, according to the 2.5:1 pressure ratio. System 10 also includes another portion that compares the intended brake cylinder pressure to the actual brake cylinder pressure BC to determine whether the appropriate brake cylinder pressure BC has actually resulted and, if not, system 10 will indicate any under-pressurization or over-pressurization that exceeds the small force bias of springs 28 and 40, respectively.

More specifically, indication system 10 will indicate a brake cylinder leak if the brake cylinder pressure in first chamber 22 leaks to 10 psi or more below the brake cylinder pressure BC target pressure, as determined by a reduction in brake pipe pressure BP. Second diaphragm 32 acts as an intended brake cylinder pressure BC as it will move in response to the force differential acting across diaphragm 32 due to emergency reservoir pressure acting in chamber 36 and the brake pipe BP pressure acting in chamber 34, where the brake pipe BP pressure has been reduced from equilibrium with the emergency reservoir pressure by the amount of the brake pipe BP reduction, thereby exerting a force via floating pin 44 onto first diaphragm 20. Because of the 2.5 to 1 differential in the wetted area of second diaphragm 32 relative to the wetted area of first diaphragm 20, brake cylinder pressure BC in first chamber 22 must increase by a corresponding 2.5 times of the pressure difference action across diaphragm 32 in third chambers 34 and 36, otherwise the force supplied by second diaphragm 32 will move first diaphragm 20 against bias spring 28. When the force supplied by second diaphragm 32 offset by the force of the brake cylinder BC pressure acting in chamber 22 across diaphragm 20, exceeds the preload of spring 28, e.g., about 10 psi, indicator 26 will be moved into the extended position, thereby providing a visual indication that the actual brake cylinder pressure BC is lower than what it should be at any given time. As a result, the movement of indicator 26 provides a signal that there has been leakage of brake cylinder pressure BC such that the brake cylinder pressure BC is less than the intended brake cylinder pressure BC by an amount equal to the preload of spring 28.

Indication system 10 will also indicate undesired leakage into the brake cylinder such that the brake cylinder pressure BC is higher than it should be at any given time. During a normal service brake application, brake cylinder pressure BC is nominally 2.5 times the reduction in brake pipe pressure BP. In a full release and recharge state, the brake pipe BP pressure, auxiliary reservoir pressure and emergency reservoir pressure are all charged to nominally the same amount, typically 90 psi, and the brake cylinder pressure is released to 0 psig. For a service brake application, brake pipe pressure BP is reduced the desired amount by the train driver. A control valve in the braking system includes a service piston which is pressurized on one side by the brake pipe and on the other side by the auxiliary reservoir. When brake pipe pressure BP is reduced to make a brake application, the service piston moves to a brake apply position as a result of the reduction of the brake pipe pressure BP. In the brake apply position, air from the auxiliary reservoir is allowed to flow to the brake cylinder until the auxiliary reservoir pressure substantively equals brake pipe pressure BP, at which time the main service piston moves to the service lap position, where communication between the auxiliary reservoir and brake cylinder is severed, and the brake cylinder pressure BC is bottled.

Because of the 2.5:1 ratio of the wetted areas of second diaphragm 32 to first diaphragm 20, indication system 10 will be in force balance with neither indicator in the extended or flagged position if the brake cylinder pressure BC is in the appropriate ratio to brake pipe pressure BP reduction during a service brake application. If the brake cylinder pressure BC in chamber 22 increases in an amount that is equal to or greater than 2.5 times the brake pipe pressure BP reduction as determined by the force differential acting across diaphragm 32 due to emergency reservoir pressure acting in chamber 36 and the brake pipe pressure acting in chamber 34 and the preload of bias spring 40 (such as when there is undesired leakage from the brake pipe, the auxiliary or emergency reservoirs into the brake cylinder), diaphragms 22 and 32 will be moved downward and indicator 38 will be moved into the extended position, thereby visually indicating a brake cylinder overcharge. As undesired leakage into the brake cylinder that produces overpressure is normally due to a defective control valve, indication system 10 can provide an immediate notification of a defective control valve.

Indictor 10 may also be used to indicate when a braking system retainer valve is inadvertently left in the high pressure position. AAR brake systems include a retainer valve that, when manually activated, will bottle up the brake cylinder pressure BC by sealing the brake cylinder exhaust. This allows the train driver to bottle up the brakes on the cars, and then make a release and recharge of the brake pipe and all of the control valves on the train while the retainer bottles the brake cylinder pressure. Retainers are typically used while descending long grades and, according to AAR standards, will bottle about 20 psi in the high pressure setting. Prior to leaving a yard, trains are subjected to a number of required tests, which includes releasing the brakes on and inspecting each car to verify that the brakes have released. Indication system 10 will provide a visual flag if the car has had brakes released, but the retainer was inadvertently set, because the 20 psi overpressure is enough to overcome the preload in spring 40 and move indicator button 38 into the extended position.

While the embodiments of the present invention are illustrated using flexible diaphragms and a floating pin to provide force communication, indication system 10 could be implemented by any combination of pistons and sealing means that provide the requisite 2.5 to 1 ratio and resulting indications.

Figure 2:
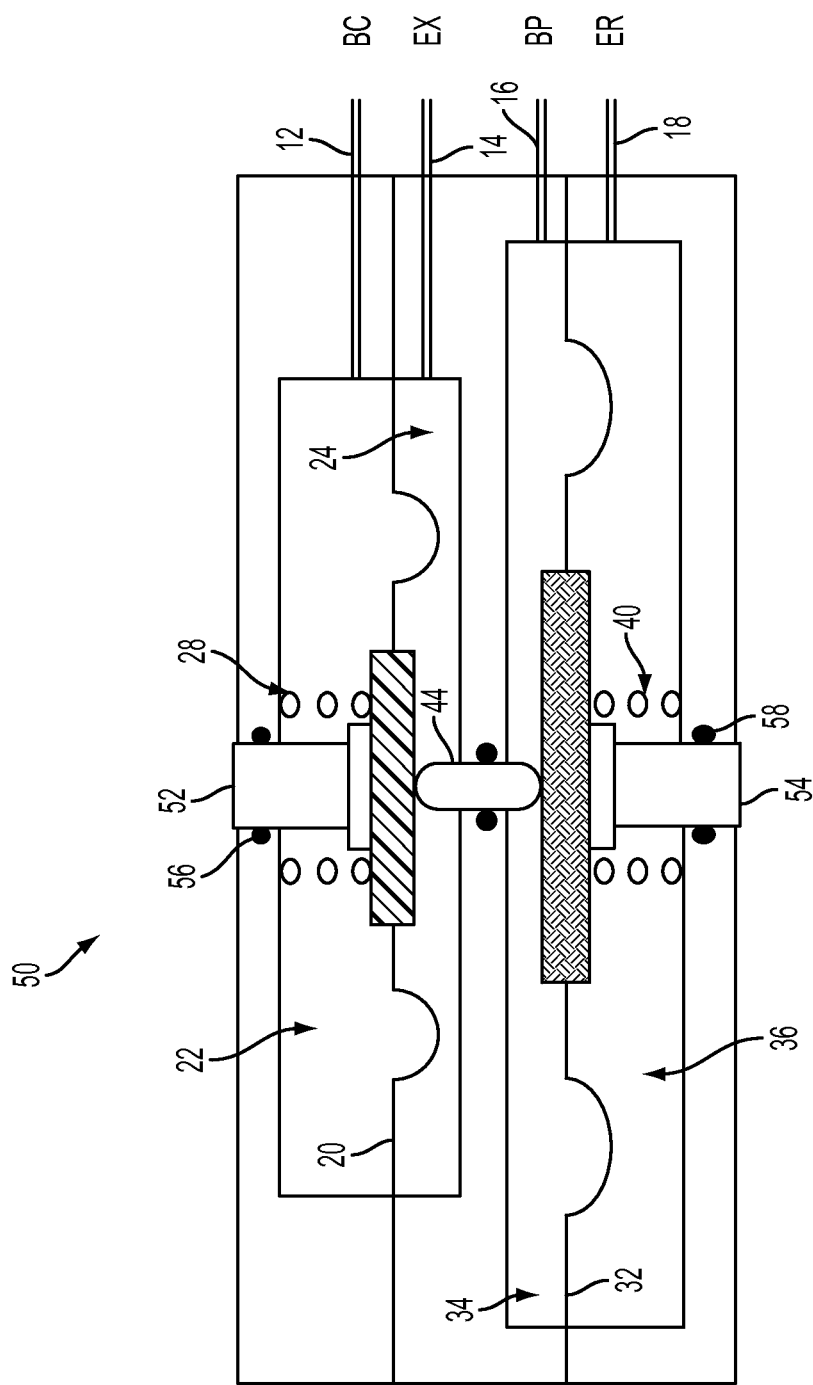
FIG. 2 is a schematic of a second embodiment of a brake maintenance indication system according to the present invention in a first position.
Figure 3:
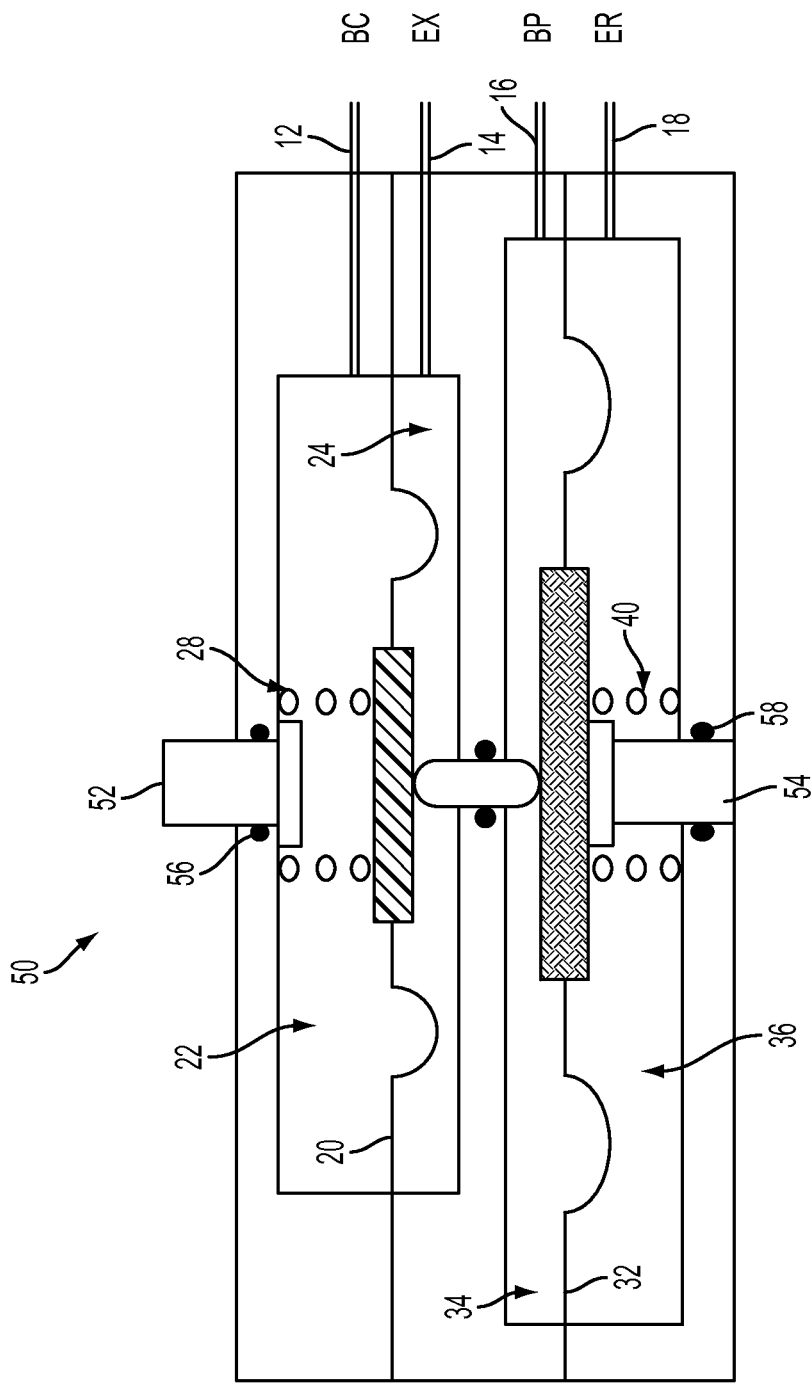
FIG. 3 is a schematic of a second embodiment of a brake maintenance indication system according to the present invention in a second position.

In another embodiment of the present invention, a brake maintenance indication system 50 may include indicator buttons 52 and 54 configured to remain in the extended position once moved by diaphragms 20 and 32, respectively. As seen in FIGS. 2 and 3, indicator buttons 52 and 54 merely rest upon diaphragms 20 and 32, respectively, and are thus free to remain in the extended position when diaphragms 20 and 32 return from the extended position to the retracted position. As seen in FIG. 3, indicator buttons 52 and 54 may be retained in the extended position by the use of O-rings 56 and 58 that frictionally engage indicator buttons 52 and 54 to retain them in the extended position while maintaining the integrity of indication system 10 and to preserve the signal of a brake system error. Indicator buttons 52 and 54 may be manually returned to the retracted position, i.e., they may be pushed back into the retracted position by maintenance personnel after the error signal has been observed or logged.

In another embodiment of the present invention, a brake maintenance indicator 60 may be implemented electronically using a brake pipe pressure transducer 62, an emergency reservoir pressure transducer 64, and a brake cylinder pressure transducer 66, along with accompanying analog or digital logic circuitry to evaluate the intended brake cylinder pressure $P_{BC}$ based on the emergency reservoir pressure $P_{ER}$ and the brake pipe pressure $P_{BP}$ using the following equation:

$$2.5 \times (P_{ER} - P_{BP}) = P_{BC}.$$

Figure 4:
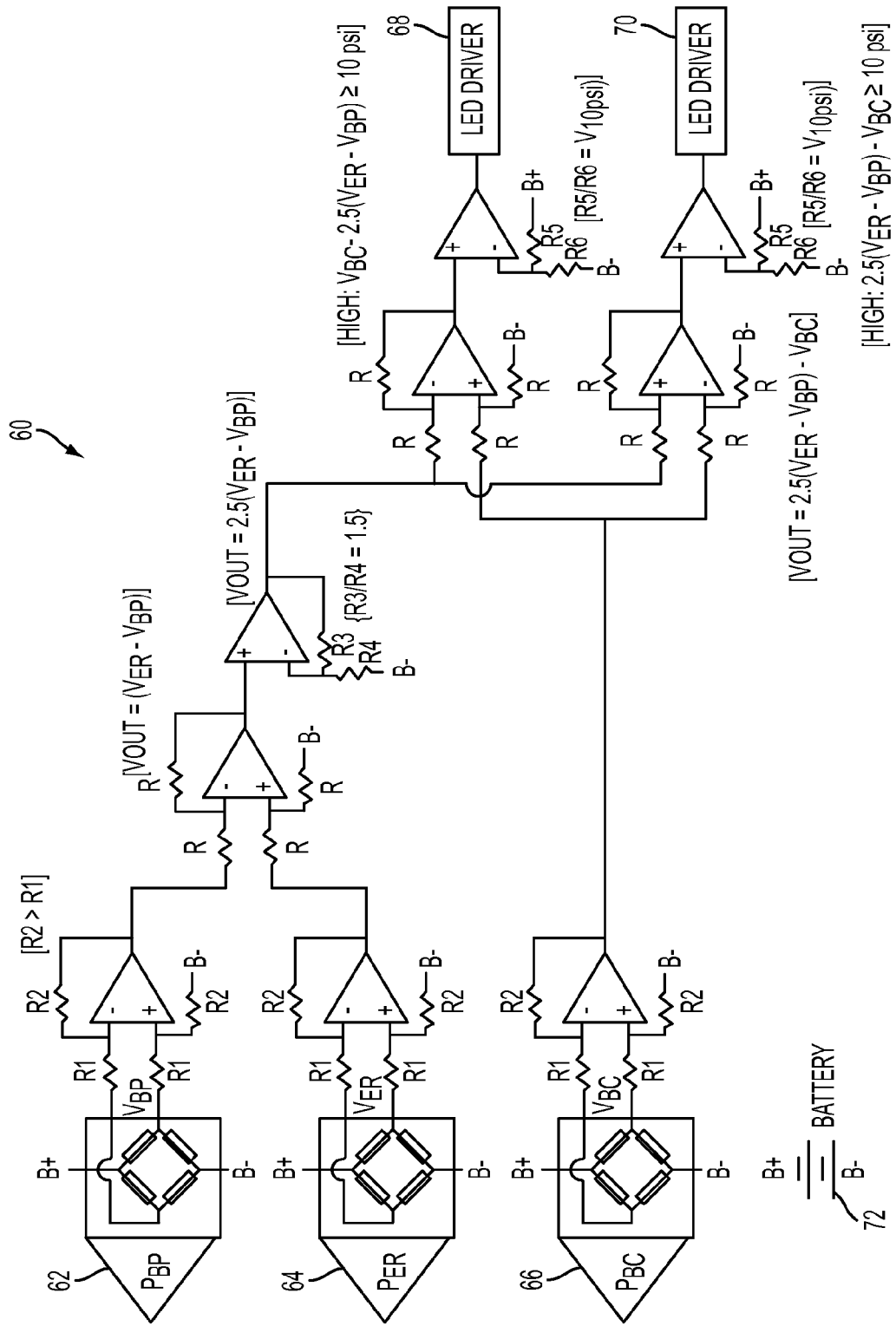
FIG. 4 is a schematic of a third embodiment of a brake maintenance indication system according to the present invention.

In this embodiment, the electronics could include light emitting diodes (LEDs) in combination with LED driver circuits 68 and 70, or other conventional visual indicators drive by the circuitry, for each of fault modes discussed above. Indication system 60 preferably uses a low power electronic circuit and a battery 72 for power, and may include a sleep mode function to conserve power when the brake pipe pressure is detected to be at zero or a nominal pressure. For example, FIG. 4 illustrates a simple analog circuit embodiment of indication system 60 that uses strain gauge type pressure transducers 62, 64, and 66, LED circuits 68 and 70 for indicating fault modes, and a battery 72 as a power source. The circuits are arranged so that all of the signals are ratiometric with the voltage of battery 72 so that the circuit function is independent of the state of charge of battery 72. In the case of an analog embodiment, resetting can occur via a switch or comparable electronic circuit. A digital embodiment may be programmed to additionally provide a memory function that would "latch" a failure indication until manually reset or until cleared by internal diagnostic logic. It should be recognized that the analog circuit of FIG. 4 could easily be provided as an integrated digital circuit, as firmware running on a microprocessor or microcontroller, or as a combination of analog and digital circuitry.

Figure 5:
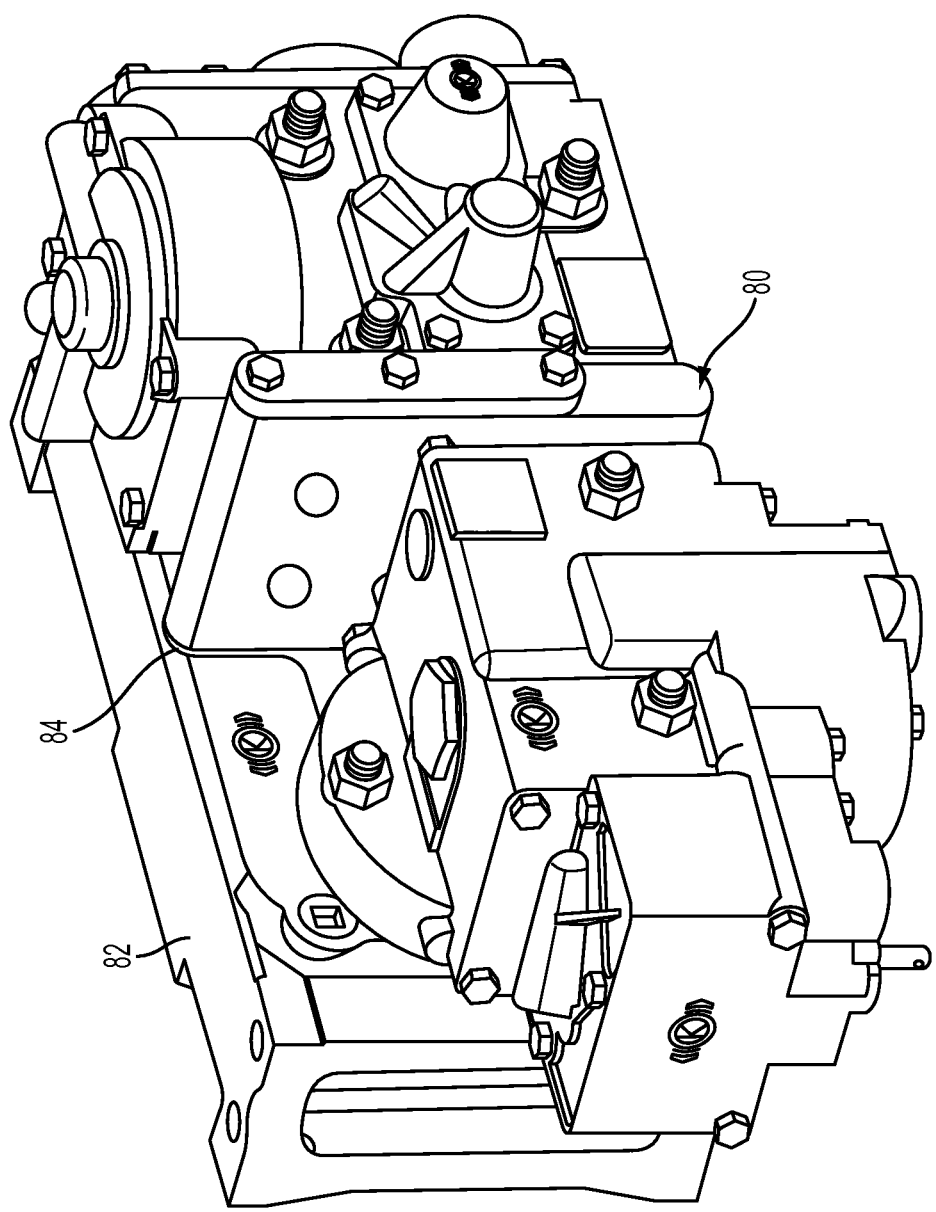
FIG. 5 is a schematic of a first embodiment of an attachment location for a brake maintenance indication system according to the present invention.
Figure 6:
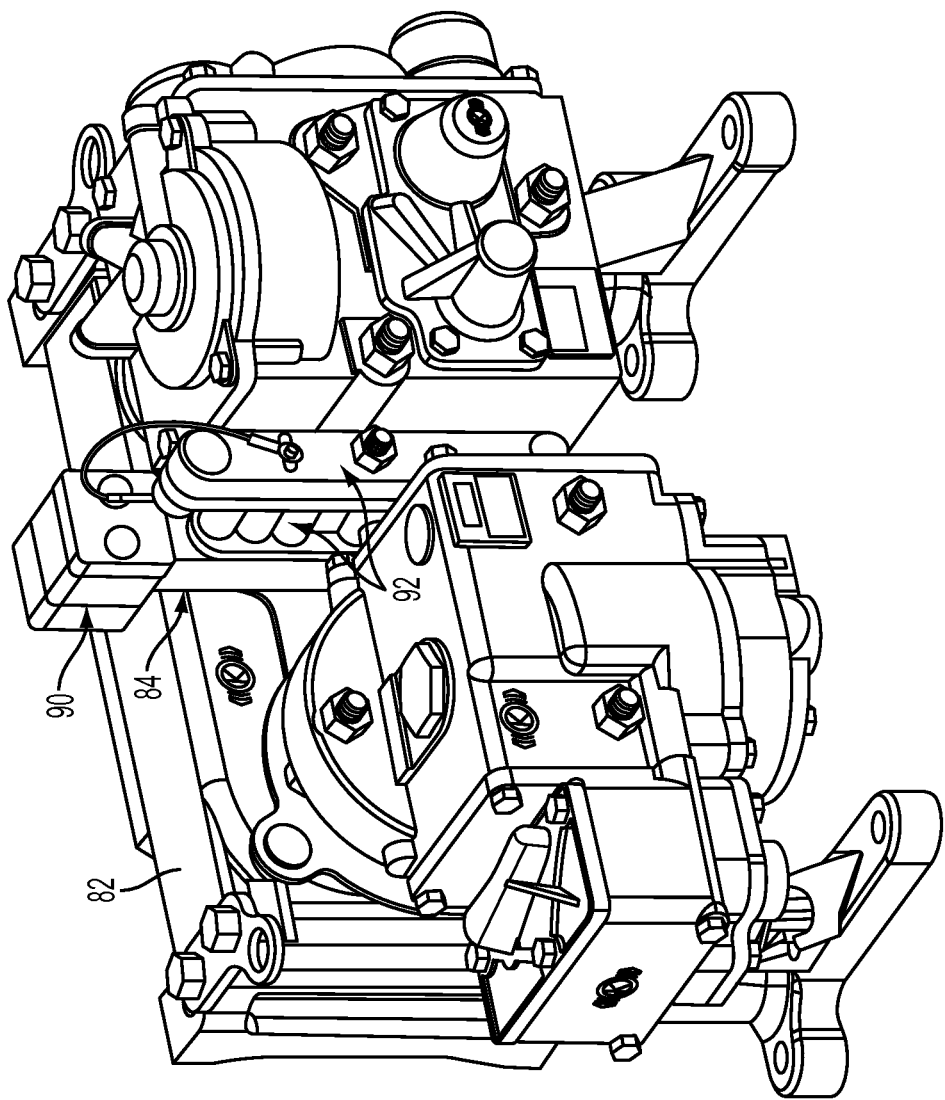
FIG. 6 is a schematic of a second embodiment of an attachment location for a brake maintenance indication system according to the present invention.

The various embodiments of a brake maintenance indicator according to the present invention may be positioned on a standard AAR pipe bracket, as further seen in FIGS. 5 and 6. For example, as seen in FIG. 5, indication system 10 may be provided in a module 80 that is adapted for interconnection to a single-sided pipe bracket 82 via the existing 4-port interface 84 on the pipe bracket 82 that is normally used for periodic connection to a single car testing device. 4-port interface 84 includes conduits that provide for fluid communication to brake pipe pressure BP, auxiliary reservoir pressure AR, emergency reservoir pressure ER, and brake cylinder pressure BC and can thus provide all of the needed inputs for the present invention. In FIG. 5, module 80 is connected directly to 4-port interface 84 of pipe bracket 82. As a result, module 80 would have to be removed so that a single car testing device could be connected to 4-port interface 84 for periodic testing of the braking system.

As seen in FIG. 6, the present invention may be incorporated into a module 90 that is attached directly along one side of module 90 to 4-port interface 84. Module 90 includes a series of conduits formed therein that provide fluid communication to the present invention as well as to a corresponding set of ports located on the second side of module 90 that replicate 4-port interface 84 so that a test adaptor 92 may be bolted over module 90 to allow for periodic connection to a single car testing device.

Figure 7:
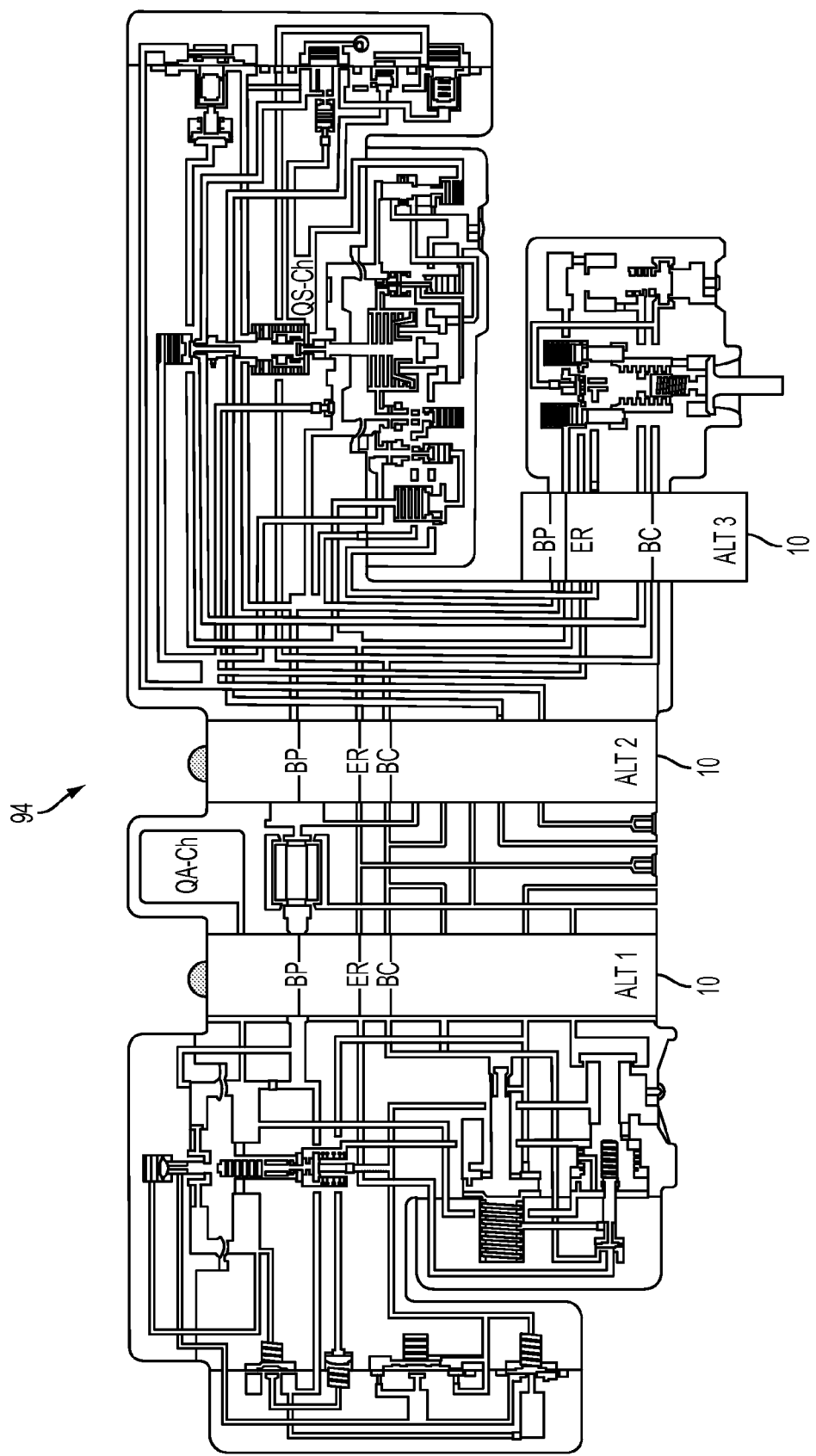
FIG. 7 is a schematic of a brake control valve having various positions for attachment of a brake maintenance indication system according to the present invention.

It should be recognized by those of skill in the art that the indication system of the present invention may be configured into any portion of a braking system control valve, such as by redesigning the packaging of the control valve, to include interface to the release valve interface, or be fitted between either the service portion and the pipe bracket or the emergency portion and the pipe bracket (or by including the present invention in any other location that has pneumatic access to brake pipe pressure BP, emergency reservoir pressure ER, and brake cylinder pressure BC). As seen in FIG. 7, indication system 10 may be integrated into any one of at least three different locations, Alt 1, Alt 2, and Alt 3, respectively, in a control valve 94.

What is claimed is:

1. A brake maintenance indication system, comprising:
   a first portion in communication with a source of brake cylinder pressure that is configured to determine the brake cylinder pressure;
   a second portion in communication with a source of brake pipe pressure and a source of emergency reservoir pressure that is configured to determine the intended brake cylinder pressure based on the difference between the brake pipe pressure and the emergency reservoir pressure;
   a first indicator configured to provide a first signal when the brake cylinder pressure is less than the intended brake cylinder pressure; and
   a second indicator configured to provide a second signal when the brake cylinder pressure exceeds the intended brake cylinder pressure.

2. The system of claim 1, wherein the first indicator comprises an indicator button that is moveable between a retracted position when the brake cylinder pressure is the same as the intended brake cylinder pressure and an extended position when the brake cylinder pressure is less than the intended brake cylinder pressure.

3. The system of claim 2, wherein the second indicator comprises an indicator button that is moveable between a retracted position when the brake cylinder pressure is the same as the intended brake cylinder pressure and an extended position when the brake cylinder pressure exceeds the intended brake cylinder pressure.

4. The system of claim 3, wherein the intended brake cylinder pressure is determined to be 2.5 times of the difference between the brake pipe pressure and the emergency reservoir pressure.

5. The system of claim 4, wherein the first portion comprises:
   a first chamber in communication with the source of brake cylinder pressure;
   a second chamber in communication with atmospheric pressure;
   a first diaphragm separating the first and second chambers and having a first wetted area, said diaphragm configured to move the first indicator to the extended position.

6. The system of claim 5, further comprising a spring providing a force biasing the first indicator into the retracted position.

7. The system of claim 5, wherein the second portion comprises:
   a third chamber in communication with a source of brake pressure;
   a fourth chamber in communication with a source of emergency reservoir pressure;
   a second diaphragm separating the third and fourth chambers and having a second wetted area that is greater than the first wetted area by a ratio of 2.5:1, said diaphragm configured to move the second indicator to the extended position.

8. The system of claim 7, further comprising a second spring providing a force biasing the second indicator into the retracted position.

9. The system of claim 8, wherein the first and second indicators are attached to the first and second diaphragms so that the first and second indicators will return to the retracted position after being moved to the extended position.

10. The system of claim 8, wherein the first and second indicators are configured to remain in the extended position until an outside force is applied to the first and second indicators to return them to the retracted position.

11. The system of claim 1, wherein the first portion comprises a first pressure transducer.

12. The system of claim 11, wherein the second portion comprises second and third pressure transducers and a circuit for calculating the intended brake cylinder pressure as 2.5 times the difference between the brake pipe pressure and the emergency reservoir pressure.

13. The system of claim 10, wherein the first and second indicators comprise light emitting diodes.

14. The system of claim 13, wherein the circuit for calculating the intended brake cylinder pressure comprises an analog circuit.

15. The system of claim 14, wherein the circuit for calculating the intended brake cylinder pressure comprises a digital circuit.

16. The system of claim 1, further comprising a housing enclosing said first and second portions and said first and second indicators and having a series of conduits configured to operatively interconnect said first and second portions to a 4-port testing interface that provides the source of brake cylinder pressure, the source of brake pipe pressure, and the source of emergency reservoir pressure.

17. The system of claim 15, wherein said housing further includes a series of ports configured to operatively connect the conduits of said housing to a 4-port test adaptor.

18. The system of claim 1, wherein said first and second portions and said first and second indicators are coupled to a control valve that provides the source of brake cylinder pressure, the source of brake pipe pressure, and the source of emergency reservoir pressure.

* * * * *